(12) United States Patent
Liu et al.

(10) Patent No.: US 8,988,378 B2
(45) Date of Patent: Mar. 24, 2015

(54) TOUCH DEVICE AND DRIVING METHOD THEREOF

(71) Applicant: Himax Technologies Limited, Tainan (TW)

(72) Inventors: Jui-Ming Liu, Tainan (TW); Li-Lin Liu, Tainan (TW); Chung-Wen Chang, Tainan (TW); Shen-Feng Tai, Tainan (TW)

(73) Assignee: Himax Technologies Limited, Tainan (TW)

( * ) Notice: Subject to any disclaimer, the term of this patent is extended or adjusted under 35 U.S.C. 154(b) by 162 days.

(21) Appl. No.: 13/685,300

(22) Filed: Nov. 26, 2012

(65) Prior Publication Data

US 2014/0145998 A1    May 29, 2014

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01)
USPC .......................... 345/173; 345/174; 178/18.06

(58) Field of Classification Search
CPC ....... G06F 3/041; G06F 3/044; G06F 3/0416; G06F 3/0418
USPC .......... 345/173, 174; 178/18.01, 18.03, 18.06
See application file for complete search history.

(56) References Cited

U.S. PATENT DOCUMENTS

2013/0307814 A1* 11/2013 Chang ........................... 345/174

* cited by examiner

*Primary Examiner* — Regina Liang
(74) *Attorney, Agent, or Firm* — J.C. Patents

(57) ABSTRACT

A touch device and a driving method thereof are provided. A scanning line driving frequency of the touch device is switched according to a plurality of preset driving frequency setting data groups, so as to prevent misjudgment of a touched position caused by electromagnetic noise.

12 Claims, 1 Drawing Sheet

TOUCH DEVICE AND DRIVING METHOD THEREOF

BACKGROUND OF THE INVENTION

1. Field of the Invention

The invention relates to a touch device and a driving method thereof and particularly relates to a touch device capable of switching a scanning line driving frequency and a driving method thereof.

2. Description of Related Art

Information technology, wireless mobile communication, and information home appliances have been rapidly developed and widely applied. To meet the demands for portable, compact, and user-friendly IT products, touch panels have been introduced as input interfaces in replacement of conventional keyboards or mice.

At present, touch panels can be generally classified into resistive, capacitive, optical, acoustic-wave, and electromagnetic touch panels, wherein resistive touch panels and capacitive touch panels are most common. Take the capacitive touch panel as an example, the capacitive touch panel sequentially drives scanning lines and simultaneously receives signals via sensing lines to obtain the change of the capacitance at the touched position on the touch panel, thereby determining the position touched by the user.

Because of the development of communication technology, electronic products that utilize wireless communication transmission are extensively used in our daily life, and such electronic products often generate electromagnetic effects when being used. If the electromagnetic frequency emitted by the electronic products approximates the scanning line driving frequency of the capacitive touch panel, the electromagnetic signal may be easily coupled to the capacitive touch panel and become noise to the touch sensing signal, which causes misjudgment of the touched position.

SUMMARY OF THE INVENTION

The invention provides a touch device and a driving method thereof for changing a scanning line driving frequency of the touch device and preventing a misjudgment of a touched position resulting from electromagnetic noise without causing touch response delay.

The invention provides a touch device which includes a touch panel, a driving unit, a sensing unit, a storage unit, and a control unit. The touch panel includes a plurality of scanning lines and a plurality of sensing lines. The driving unit is coupled to the touch panel for driving the scanning lines of the touch panel. The sensing unit is coupled to the touch panel for performing a touch sensing on the touch panel to generate a touch signal. The storage unit stores a plurality of driving frequency setting data groups, wherein the driving frequency setting data groups correspond to different scanning line driving frequencies. The control unit is coupled to the driving unit, the sensing unit, and the storage unit and determines whether the touch device is affected by noise interference according to the touch signal and the driving frequency setting data group that corresponds to the scanning line driving frequency of the driving unit. If the control unit determines that the touch device is affected by noise interference, the driving unit is controlled to switch the frequency that drives the scanning lines to another scanning line driving frequency.

In an embodiment of the invention, the control unit further determines a touched position of the touch panel according to the touch signal and the driving frequency setting data group that corresponds to the scanning line driving frequency of the driving unit.

In an embodiment of the invention, each of the driving frequency setting data groups includes a capacitance data bank and a touch reference value. The capacitance data bank includes capacitance information of the touch panel that corresponds to the driving frequency of the scanning lines. The touch reference value indicates a capacitance of the touch panel when the touch panel is not touched.

In an embodiment of the invention, the control unit further converts the touch signal into a digital signal and then determines whether a difference between the touch reference value and the digital signal obtained when the touch panel is not touched is greater than a threshold value. The control unit determines that the touch device is affected by noise interference if the difference is greater than the threshold value.

In an embodiment of the invention, the threshold value is a difference between the touch reference value and the digital signal obtained by the control unit by converting the touch signal corresponding to the touched position when the touch panel is touched.

In an embodiment of the invention, if the differences between the touch reference values of the driving frequency setting data groups and the digital signals obtained by the control unit by converting the touch signals when the touch panel is not touched are all greater than the threshold value, the control unit controls the driving unit to select the scanning line driving frequency that corresponds to the driving frequency setting data group having the least difference as the driving frequency of the scanning lines.

In an embodiment of the invention, the driving unit and the sensing unit perform the touch sensing on the touch panel by first performing a self-capacitance touch sensing and then performing a mutual-capacitance touch sensing.

The invention further provides a driving method of a touch device, wherein the touch device includes a touch panel and a driving unit that is used for driving a plurality of scanning lines on the touch panel. The driving method includes the following steps. A plurality of driving frequency setting data groups are stored, wherein the driving frequency setting data groups correspond to different scanning line driving frequencies. A touch sensing is performed on the touch panel to generate a touch signal. A step is performed to determine whether the touch device is affected by noise interference according to the touch signal and the driving frequency setting data group that corresponds to the scanning line driving frequency of the driving unit. If it is determined that the touch device is affected by noise interference, the driving unit is controlled to switch the frequency that drives the scanning lines to another scanning line driving frequency.

In an embodiment of the invention, the driving method further includes determining a touched position of the touch panel according to the touch signal and the driving frequency setting data group that corresponds to the scanning line driving frequency of the driving unit.

In an embodiment of the invention, each of the driving frequency setting data groups includes a capacitance data bank and a touch reference value. The capacitance data bank includes capacitance information of the touch panel that corresponds to the driving frequency of the scanning lines. The touch reference value indicates a capacitance of the touch panel when the touch panel is not touched.

In an embodiment of the invention, the step of determining whether the touch device is affected by noise interference according to the touch signal and the driving frequency setting data group that corresponds to the scanning line driving frequency of the driving unit further includes the following steps. The touch signal is converted into a digital signal. A step is performed to determine whether a difference between the touch reference value and the digital signal obtained when the touch panel is not touched is greater than a threshold value. If the difference is greater than the threshold value, it is determined that the touch device is affected by noise interference.

In an embodiment of the invention, the threshold value is a difference between the touch reference value and the digital signal obtained by converting the touch signal corresponding to the touched position when the touch panel is touched.

In an embodiment of the invention, if the differences between the touch reference values of the driving frequency setting data groups and the digital signals obtained by converting the touch signals when the touch panel is not touched are all greater than the threshold value, the driving unit is controlled to select the scanning line driving frequency that corresponds to the driving frequency setting data group having the least difference as the driving frequency of the scanning lines.

In an embodiment of the invention, the driving method includes first performing a self-capacitance touch sensing and then performing a mutual-capacitance touch sensing, so as to perform the touch sensing on the touch panel.

Based on the above, the invention switches the scanning line driving frequency of the touch device according to the plurality of preset driving frequency setting data groups, so as to prevent the misjudgment of the touched position resulting from electromagnetic noise without causing touch response delay.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
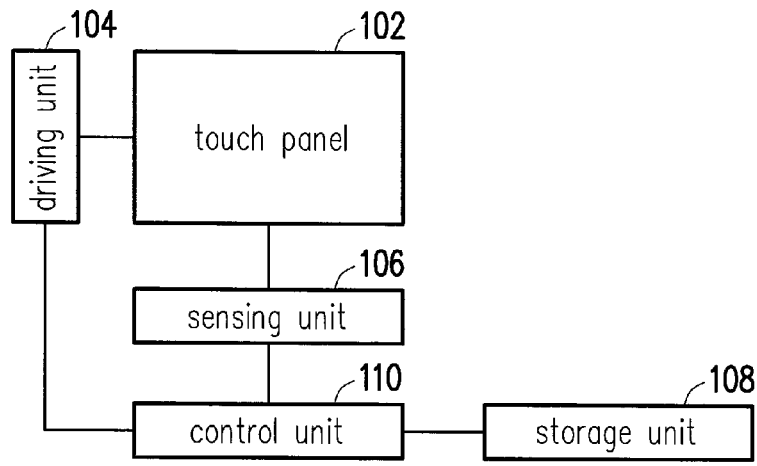
FIG. 1 is a schematic diagram of a touch device according to an embodiment of the invention.

FIG. 1 is a schematic diagram of a touch device according to an embodiment of the invention. Referring to FIG. 1, a touch device 100 includes a touch panel 102, a driving unit 104, a sensing unit 106, a storage unit 108, and a control unit 110. The driving unit 104 and the sensing unit 106 are coupled to the touch panel 102. The control unit 110 is coupled to the driving unit 104, the sensing unit 106, and the storage unit 108. To be more specific, the touch panel 102 includes a plurality of scanning lines and a plurality of sensing lines (not shown). In this embodiment, the driving unit 104 and the sensing unit 106 perform a touch sensing on the touch panel 102 by first performing a self-capacitance touch sensing and then performing a mutual-capacitance touch sensing.

When performing the self-capacitance touch sensing, the driving unit 104 simultaneously detects a change of a capacitance of each of the scanning lines on the touch panel 102 to generate a touch signal, and the sensing unit 106 simultaneously detects a change of a capacitance of each of the sensing lines on the touch panel 102 to generate a touch signal. The control unit 110 determines a position touched by the user according to the touch signals output by the driving unit 104 and the sensing unit 106. When performing the mutual-capacitance touch sensing, the driving unit 104 sequentially drives pair scanning lines, and the sensing unit 106 simultaneously detects the sensing lines to generate a touch signal. The control unit 110 obtains the change of the capacitance at each position of the touch panel 102 by the touch signal output by the sensing unit 106, so as to determine the position touched by the user.

The storage unit 108 stores a plurality of driving frequency setting data groups, wherein the driving frequency setting data groups correspond to different scanning line driving frequencies. Because the capacitance detected by the sensing unit 106 differs according to different scanning line driving frequencies, the control unit 110 needs to determine the touched position of the touch panel 102 based on different driving frequency setting data groups. That is, when the driving unit 104 drives the scanning lines by a preset scanning line driving frequency, the control unit 110 determines the touched position according to the corresponding driving frequency setting data group and the touch signal obtained by sensing the touch panel 102.

More specifically, each of the driving frequency setting data groups includes a capacitance data bank and a touch reference value. The capacitance data bank includes capacitance information of the touch panel 102 that corresponds to the driving frequency of the scanning line, i.e. the capacitance detected by the sensing unit 106 under a specific scanning line driving frequency. The touch reference value indicates a capacitance of the touch panel 102 when the touch panel 102 is not touched. When the control unit 110 receives the touch signal from the sensing unit 106, the control unit 110 converts the touch signal into a digital signal and determines whether a touch event occurs according to a difference between the digital signal and the touch reference value. When the difference between the digital signal and the touch reference value exceeds a preset value, the control unit 110 determines that the position that corresponds to the touch signal is touched by the user.

In this embodiment, the sensing of the touched position of touch panel 102 is carried out by the self-capacitance touch sensing followed by the mutual-capacitance touch sensing. Thus, an interference of the electromagnetic noise only occurs during the mutual-capacitance touch sensing. Therefore, the control unit 110 also determines whether the touch device 100 is affected by noise interference according to the touch signal and the driving frequency setting data group. In other words, if the control unit 110 does not sense any touch event during the self-capacitance touch sensing but senses the touch event during the mutual-capacitance touch sensing, it indicates that the touch device 100 is affected by the electromagnetic noise from outside.

More specifically, the control unit 110 determines whether noise interference occurs by determining whether the difference between the touch reference value and the digital signal obtained when the touch panel 102 is not touched is greater than a threshold value. If the difference between the digital signal and the touch reference value is greater than the threshold value, it indicates that the touch device 100 is affected by the electromagnetic noise from outside. For example, the threshold value may be a difference between the touch reference value and a digital signal obtained when the touch panel 102 is touched. However, it is noted that the invention is not limited to the above, and the threshold value may be set greater or less according to actual demands.

If the control unit 110 determines that the touch device 100 is affected by noise interference, the control unit 110 controls the driving unit 104 to switch the frequency that drives the scanning lines to another preset scanning line driving frequency, i.e. the scanning line driving frequency corresponding to the driving frequency setting data group. Because the driving frequency setting data groups corresponding to different scanning line driving frequencies are already stored in the storage unit 108, when the driving unit 104 switches to another scanning line driving frequency, the control unit 110 can instantly change to the touch position determining parameters (e.g. capacitance data bank and touch reference value) that corresponds to the another scanning line driving frequency without causing any touch response delay.

In addition, if the control unit 110 determines that the differences between the touch reference values of the driving frequency setting data groups and the digital signals obtained when the touch panel 102 is not touched are all greater than the threshold value, the control unit 110 controls the driving unit 104 to select the scanning line driving frequency that corresponds to the driving frequency setting data group having the least difference as the driving frequency for the scanning lines, that is, to select the scanning line driving frequency that is less affected by the electromagnetic noise as the driving frequency of the scanning lines.

Figure 2:
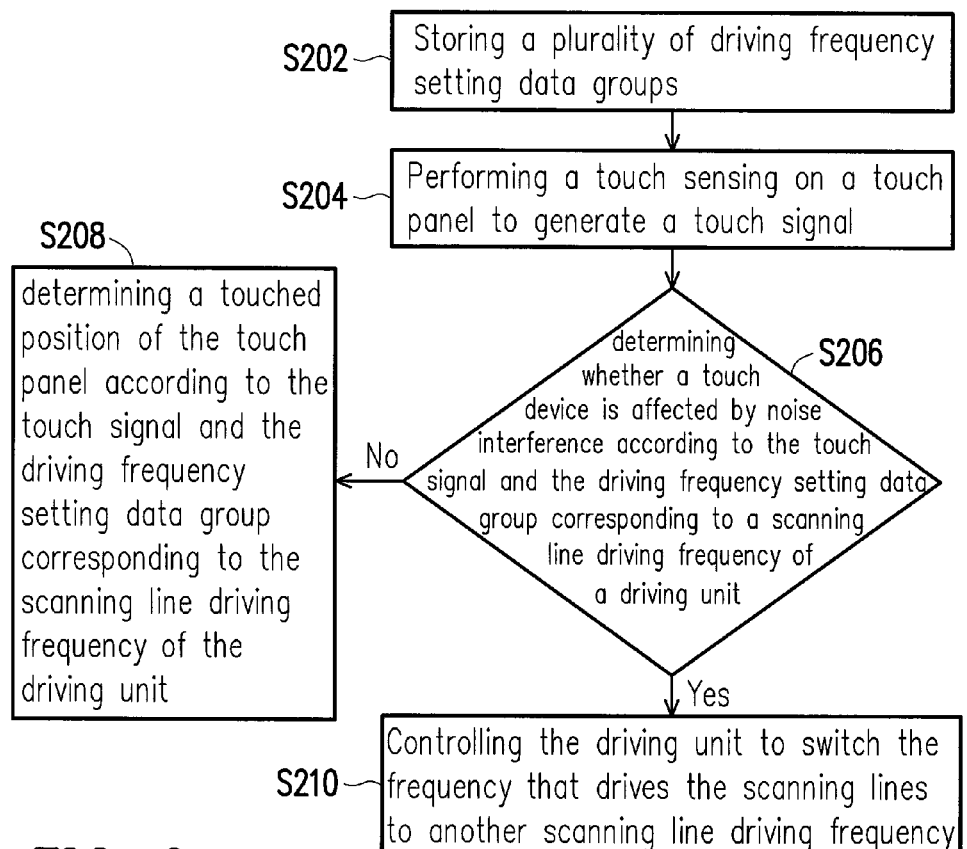
FIG. 2 is a flowchart illustrating a driving method of a touch device according to an embodiment of the invention.

FIG. 2 is a flowchart illustrating a driving method of a touch device according to an embodiment of the invention. Referring to FIG. 2, a driving method of the aforementioned touch device 100 includes the following steps. First, a plurality of the driving frequency setting data groups are stored (Step S202), wherein the driving frequency setting data groups respectively correspond to different scanning line driving frequencies, and each of the driving frequency setting data groups includes the capacitance data bank and the touch reference value. The capacitance data bank includes capacitance information of the touch panel that corresponds to the driving frequency of the scanning lines, and the touch reference value indicates the capacitance of the touch panel when the touch panel is not touched.

Then, a touch sensing is performed on the touch panel to generate a touch signal (Step S204). Next, a step is performed to determine whether the touch device is affected by noise interference according to the touch signal and the driving frequency setting data group that corresponds to the scanning line driving frequency of the driving unit (Step S206).

More specifically, in Step S206, the touch signal is first converted into the digital signal. Then, it is determined whether the difference between the touch reference value and the digital signal obtained when the touch panel is not touched is greater than the threshold value. If the difference between the digital signal and the touch reference value is greater than the threshold value, it is determined that the touch device is affected by noise interference. On the contrary, if the difference between the digital signal and the touch reference value is not greater than the threshold value, it is determined that the touch device is not affected by noise interference. For example, the threshold value may be a difference between the touch reference value and the digital signal obtained by converting the touch signal corresponding to the touched position when the touch panel is touched. However, it is noted that the invention is not limited to the above.

If it is determined that the touch device is not affected by noise interference, a step is performed to determine the touched position of the touch panel according to the touch signal and the driving frequency setting data group that corresponds to the scanning line driving frequency of the driving unit (Step S208). If it is determined that the touch device is not affected by noise interference, the driving unit is controlled to switch the frequency that drives the scanning lines to another scanning line driving frequency (Step S210).

In addition, if the differences between the touch reference values of the driving frequency setting data groups and the digital signals obtained by converting the touch signals when the touch panel is not touched are all greater than the threshold value, the driving unit is controlled to select the scanning line driving frequency that corresponds to the driving frequency setting data group having the least difference as the driving frequency of the scanning lines, so as to minimize the interference of electromagnetic noise.

To conclude the above, according to the invention, the scanning line driving frequency of the touch device is switched according to multiple preset driving frequency setting data groups, so as to prevent misjudgment of the touched position caused by electromagnetic noise. Because the driving frequency setting data groups that correspond to different scanning line driving frequencies are stored in the storage unit in advance, the control unit can instantly change between the touch position determining parameters corresponding to different scanning line driving frequencies without causing any touch response delay.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A touch device, comprising:
 a touch panel comprising a plurality of scanning lines and a plurality of sensing lines;
 a driving unit coupled to the touch panel and driving the scanning lines of the touch panel;
 a sensing unit coupled to the touch panel and performing a touch sensing on the touch panel to generate a touch signal, wherein the driving unit and the sensing unit perform the touch sensing on the touch panel by first performing a self-capacitance touch sensing and then performing a mutual-capacitance touch sensing, wherein when performing the self-capacitance touch sensing, the driving unit simultaneously drives all the scanning lines on the touch panel, and when performing the mutual-capacitance touch sensing, the driving unit sequentially drives all the scanning lines;
 a storage unit storing a plurality of driving frequency setting data groups, wherein the driving frequency setting data groups correspond to a plurality of different scanning line driving frequencies; and
 a control unit coupled to the driving unit, the sensing unit, and the storage unit and determining whether the touch device is affected by noise interference according to the touch signal and the driving frequency setting data group that corresponds to the scanning line driving frequency of the driving unit, wherein when the control unit determines that the touch device is affected by noise interference, the driving unit is controlled to switch the frequency that drives the scanning lines to another scanning line driving frequency.

2. The touch device according to claim 1, wherein the control unit further determines a touched position of the touch panel according to the touch signal and the driving frequency setting data group that corresponds to the scanning line driving frequency of the driving unit.

3. The touch device according to claim 1, wherein each of the driving frequency setting data groups comprises a capacitance data bank and a touch reference value, wherein the capacitance data bank comprises capacitance information of the touch panel that corresponds to the driving frequency of the scanning lines, and the touch reference value indicates a capacitance of the touch panel when the touch panel is not touched.

4. The touch device according to claim 3, wherein the control unit further converts the touch signal into a digital signal and determines whether a difference between the touch reference value and the digital signal obtained when the touch panel is not touched is greater than a threshold value, and the control unit determines that the touch device is affected by noise interference if the difference is greater than the threshold value.

5. The touch device according to claim 4, wherein the threshold value is a difference between the touch reference value and the digital signal obtained by the control unit by converting the touch signal corresponding to the touched position when the touch panel is touched.

6. The touch device according to claim 4, wherein if the differences between the touch reference values of the driving frequency setting data groups and the digital signals obtained by the control unit by converting the touch signals when the touch panel is not touched are all greater than the threshold value, the control unit controls the driving unit to select the scanning line driving frequency that corresponds to the driving frequency setting data group having the least difference as the driving frequency of the scanning lines.

7. A driving method of a touch device, the touch device comprising a touch panel and a driving unit for driving a plurality of scanning lines on the touch panel, the driving method comprising:
  storing a plurality of driving frequency setting data groups, wherein the driving frequency setting data groups correspond to a plurality of different scanning line driving frequencies;
  performing a touch sensing on the touch panel to generate a touch signal by first performing a self-capacitance touch sensing and then performing a mutual-capacitance touch sensing to perform the touch sensing on the touch panel, wherein when performing the self-capacitance touch sensing, all the scanning lines on the touch panel are simultaneously driven, and when performing the mutual-capacitance touch sensing, all the scanning lines are sequentially driven;
  determining whether the touch device is affected by noise interference according to the touch signal and the driving frequency setting data group that corresponds to the scanning line driving frequency of the driving unit; and
  controlling the driving unit to switch the frequency that drives the scanning lines to another scanning line driving frequency if it is determined that the touch device is affected by noise interference.

8. The driving method of the touch device according to claim 7, further comprising:
  determining a touched position of the touch panel according to the touch signal and the driving frequency setting data group that corresponds to the scanning line driving frequency of the driving unit.

9. The driving method of the touch device according to claim 8, wherein each of the driving frequency setting data groups comprises a capacitance data bank and a touch reference value, wherein the capacitance data bank comprises capacitance information of the touch panel that corresponds to the driving frequency of the scanning lines, and the touch reference value indicates a capacitance of the touch panel when the touch panel is not touched.

10. The driving method of the touch device according to claim 9, wherein the step of determining whether the touch device is affected by noise interference according to the touch signal and the driving frequency setting data group that corresponds to the scanning line driving frequency of the driving unit further comprises:
  converting the touch signal into a digital signal;
  determining whether a difference between the touch reference value and the digital signal obtained when the touch panel is not touched is greater than a threshold value; and
  determining that the touch device is affected by noise interference if the difference is greater than the threshold value.

11. The driving method of the touch device according to claim 10, wherein the threshold value is a difference between the touch reference value and the digital signal obtained by converting the touch signal corresponding to the touched position when the touch panel is touched.

12. The driving method of the touch device according to claim 10, wherein if the differences between the touch reference values of the driving frequency setting data groups and the digital signals obtained by converting the touch signals when the touch panel is not touched are all greater than the threshold value, the driving unit is controlled to select the scanning line driving frequency that corresponds to the driving frequency setting data group having the least difference as the driving frequency of the scanning lines.

* * * * *